United States Patent [19]

Fu et al.

[11] Patent Number: 4,954,244

[45] Date of Patent: * Sep. 4, 1990

[54] TREATMENT OF SPENT CRACKING CATALYSTS

[75] Inventors: Chia-Min Fu; Michael K. Maholland, both of Bartlesville, Okla.

[73] Assignee: Phillips Petroleum Company, Bartlesville, Okla.

[ * ] Notice: The portion of the term of this patent subsequent to Mar. 21, 2006 has been disclaimed.

[21] Appl. No.: 370,471

[22] Filed: Jun. 22, 1989

[51] Int. Cl.$^5$ .................... C10G 11/05; B01J 38/66; B01J 29/38

[52] U.S. Cl. .................. 208/120; 208/52 CT; 502/26; 502/516; 502/521

[58] Field of Search ............ 502/26, 27, 25, 32, 502/521; 208/52 CT, 120

[56] References Cited

U.S. PATENT DOCUMENTS

| | | | |
|---|---|---|---|
| 3,364,151 | 1/1968 | Disegna et al. | 252/441 |
| 3,711,422 | 1/1973 | Johnson et al. | 252/414 |
| 3,933,983 | 1/1976 | Elliott, Jr. | 423/328 |
| 4,025,458 | 5/1977 | McKay | 252/416 |
| 4,111,845 | 9/1978 | McKay | 252/455 Z |
| 4,158,621 | 6/1979 | Swift et al. | 208/114 |
| 4,192,770 | 3/1980 | Singleton | 502/26 |
| 4,289,608 | 9/1981 | McArthur | 208/121 |
| 4,321,128 | 3/1982 | Yoo | 208/114 |
| 4,337,144 | 6/1982 | Yoo | 208/120 |
| 4,377,470 | 3/1983 | Hettinger, Jr. et al. | 208/120 |
| 4,424,116 | 6/1983 | Hettinger, Jr. | 208/120 |
| 4,473,463 | 9/1984 | Bertus et al. | 208/120 |
| 4,500,422 | 2/1985 | Miale et al. | 208/117 |
| 4,513,093 | 4/1985 | Beck et al. | 502/521 |
| 4,549,958 | 10/1985 | Beck et al. | 208/253 |
| 4,556,749 | 12/1985 | Hazbun | 585/330 |
| 4,559,131 | 12/1985 | Miale | 208/111 |
| 4,596,704 | 6/1986 | Miale et al. | 423/328 |
| 4,728,629 | 3/1988 | Bertus et al. | 502/62 |
| 4,794,095 | 12/1988 | Walker et al. | 502/64 |
| 4,814,066 | 3/1989 | Fu | 208/120 |

FOREIGN PATENT DOCUMENTS 0295019 12/1988 European Pat. Off. .
0295020 12/1988 European Pat. Off. .

OTHER PUBLICATIONS

"Petroleum Refining", James H. Gary and Glenn E. Handwerk, 1975, Marcel Dekker, Inc., pp. 86-95, 101, 110 and 111.

Primary Examiner—Paul E. Konopka
Attorney, Agent, or Firm—K. K. Brandes

[57] ABSTRACT

A process for reactivating a spent, metal-contaminated zeolite-containing cracking catalyst composition comprises the sequential steps of contacting the catalyst composition with dissolved ammonium compound (preferably $NH_4NO_3$), contacting with a fluorine compound (preferably $NH_4F$), and treatment with a passivating agent (preferably Mg, Ca, B, A, P and/or Sb). The reactivated cracking catalyst obtained by this reactivation process is employed in a catalytic cracking process.

41 Claims, No Drawings

TREATMENT OF SPENT CRACKING CATALYSTS

Background of the Invention

This invention relates to a method of reactivating spent zeolite-containing catalytic cracking catalysts and of passivating metal deposits thereon by sequential treatment with suitable compounds. In another aspect, this invention relates to a catalytic cracking process employing a reactivated spent cracking catalyst.

Methods of rejuvenating deactivated zeolite-containing cracking catalysts by treatment with fluorine compounds are known and have been disclosed in the patent literature, e.g., in U.S. Pat. Nos. 4,814,066, 4,559,131 and 4,500,422. Also, the use of so-called passivating agents for alleviating the detrimental effects of metal contaminants on cracking catalysts has been described in the patent literature, e.g., in U.S. Pat. Nos. 3,711,422, 4,337,144 and 4,549,958. However, there is an ever present need to develop new, more effective and/or efficient catalyst reactivation and metals passivation processes.

Summary of the Invention

It is an object of this invention to provide a multi-step process for treating a spent zeolite-containing cracking catalyst composition which contains metal contaminant(s) under such conditions as to enhance its catalytic cracking activity and to reduce its capability of generating hydrogen during catalytic cracking. It is a further object of this invention to provide a reactivated spent cracking catalyst composition. It is another object of this invention to provide a catalytic cracking process employing a reactivated spent cracking catalyst composition. A particular object of this invention is to provide an improvement of the process of U.S. Pat. No. 4,814,066, the disclosure of which is herein incorporated by reference. Other objects and advantages will become apparent from the detailed description of the invention and the appended claims.

In accordance with this invention, a process for reactivating a spent cracking catalyst composition comprises the steps of:

(a) contacting a spent zeolite-containing catalytic cracking catalyst composition, which contains at least one metal contaminant and at least a portion of which has been previously been used in a catalytic cracking process (and has thereby lost some of its initial catalytic cracking activity, i.e., its cracking activity before its use in the catalytic cracking process), with a solution of an ammonium compound other than ammonium fluoride, under such conditions as to enhance the catalytic cracking activity of said catalyst composition;

(b) at least partially (preferably substantially) separating the catalyst composition having enhanced catalytic cracking activity obtained in step (a) from said solution used in step (a);

(c) contacting the at least partially separated cracking catalyst composition having undergone steps (a) and (b) with at least one fluorine compound selected from the group consisting of $NH_4F$, $NH_4HF_2$ and HF, under such conditions as to enhance the catalytic cracking activity of the catalyst composition having undergone in steps (a) and (b); and (d) treating the reactivated catalyst composition obtained in step (c) with at least one metals passivating agent selected from the group consisting of compounds of an alkaline earth metal (Be, Mg, Ca, Sr and Ba), boron, aluminum, antimony and phosphorus, under such conditions as to reduce the detrimental effect of said at least one metal contaminant during catalytic cracking, as measured by hydrogen generation in a test for catalytically cracking a heavy hydrocarbon-containing oil, carried out substantially in accordance with the procedure of Example II of U.S. Pat. No. 4,794,095, the disclosure of which is herein incorporated by reference.

In a preferred embodiment, the solution used in step (a) is an aqueous solution, more preferably a solution comprising water and ammonium nitrate. In another preferred embodiment, a heating step (c1) is carried out after step (c) and before step (d), so as to dry the material obtained in step (c). In a further preferred embodiment, the fluorine compound used in step (c) is ammonium fluoride, more preferably dissolved in water. In a particularly preferred embodiment, the solution used in step (c) is an aqueous solution comprising about 0.3 to about 2 mol/l $NH_4F$. The preferred passivating agents in step (d) are compounds of Sb, Mg, Ca, B, Al or P, or mixtures thereof. Presently more preferred are compounds of Sb.

Also in accordance with this invention, there is provided a reactivated spent catalytic cracking catalyst composition having undergone steps (a) through (d), as defined above.

Further in accordance with this invention, a catalytic cracking process is provided comprising the step of contacting a hydrocarbon-containing feed stream with a zeolite-containing cracking catalyst composition, under such cracking conditions as to obtain at least one normally liquid (i.e., liquid at 25° and 1 atm.) hydrocarbon containing product stream having a lower initial boiling point and higher API gravity than said hydrocarbon-containing feed stream, wherein at least a portion of said zeolite-containing cracking catalyst composition is a reactivated spent catalyst composition having undergone steps (a) through (d), as defined above.

Detailed Description of the Invention

The term "catalytic cracking process", as used herein, implies that essentially no hydrocracking occurs and that the catalytic cracking process is carried out with a hydrocarbon-containing oil, substantially in the absence of added hydrogen gas. The term "spent", as used herein, implies that at least a portion of the zeolite-containing catalyst composition employed in step (a) has been used in a process for catalytically cracking hydrocarbon-containing oils, in particular those containing metal (Ni, V, Cu) impurities, and has then been regenerated by stripping of adhered oil from the catalyst (such as by steam-stripping) and subsequent heating in an oxidizing gas atmosphere (such as air) so as to burn off coke deposits on the catalyst composition.

Any spent zeolite-containing catalyst composition, which contains at least one metal contaminant and at least a portion of which has previously been used in a catalytic cracking process, can be used as starting material in step (a) of the process of this invention. The spent catalyst composition can contain any portion of such regenerated catalyst composition, ranging from 100% to about 10 weight-% (i.e., containing 0% to about 90 weight-% fresh, unused zeolite-containing cracking catalyst composition). The term "spent catalyst composition" encompasses equilibrium cracking catalysts, which are commonly employed in commercial cracking operations and generally comprise a physical blend of regenerated used catalyst composition and fresh (unused) cracking catalyst composition. An equilibrium catalyst generally comprises a mixture of catalyst particles of various ages, i.e., a portion of the equilibrium catalyst particles has passed through a varying number of cracking and regeneration cycles, while a small portion of the equilibrium catalyst particles is fresh (unused) cracking catalyst composition.

The zeolite component of the spent zeolite-containing cracking composition of this invention can be any natural or synthetic crystalline aluminosilicate zeolite which exhibits cracking activity. Non-limiting examples of such zeolites are faujasite, chabazite, mordenite, offretite, erionite, Zeolon, zeolite X, zeolite Y, zeolite L, zeolite ZSM-4, zeolite ZSM-5, zeolite ZSM-11, zeolite ZSM-12, zeolite ZSM-23, zeolite ZSM-35, zeolite ZSM-38, zeolite ZSM-48, and the like, and mixtures thereof. Additional examples of suitable zeolites are listed in U.S. Pat. No. 4,158,621, the disclosure of which is herein incorporated by reference. The term "zeolite", as used herein, includes zeolites which have been pretreated, such as those from which a portion of Al has been removed from the crystalline framework, and zeolites which have been ion-exchanged with rare earth metal or ammonium or by other conventional ion-exchange methods. The term "zeolite", as used herein, also includes essentially aluminum-free silica polymorphs, such as silicalite, chromia silicates, ferrosilicates, borosilicates, and the like, as disclosed in U.S. Pat. No. 4,556,749, the disclosure of which is herein incorporated by reference.

Generally the zeolite component of the spent cracking catalyst composition is dispersed in a suitable solid refractory inorganic matrix material, such as alumina, silica, silica-alumina (presently preferred), aluminum phosphate, magnesium oxide, mixtures of two or more of the above-listed materials, and the like. The preparation of such zeolite/matrix cracking catalyst compositions is well known and is not a critical feature of this invention. Generally, the surface area (measured by nitrogen adsorption, substantially in accordance with the BET method of Brunauer, Emmett and Teller) of the spent zeolite/matrix cracking catalyst composition used in step (a) is in the range of from about 100 to about 800 m$^2$/g. Generally, the weight ratio of zeolite to matrix material in the spent cracking catalyst composition is in the range of from about 1:20 to about 1:1.

The spent zeolite-containing cracking catalyst composition employed in step (a) of the process of the invention contains metal compounds as contaminants (generally as oxides), such as compounds (particularly oxides) of Ni, V, Fe, and Cu, and the like. Contaminants of each metal can be present in amounts ranging from traces (about 0.01 weight-%) to about 2.0 weight-% of contaminant of each metal, expressed as metal oxide. These impurities in the spent cracking catalyst compositions have generally been absorbed from the oil feed in a previous cracking process. However, the origin of these metal impurities is not believed to be a critical feature of this invention.

Any suitable ammonium compound other than ammonium fluoride can be used as solute in the solution employed in step (a) of this invention. Non-limiting examples of suitable ammonium compounds are: $NH_4NO_3$ (presently preferred), $NH_4Cl$, $NH_4HSO_4$, $(NH_4)_2SO_4$, $NH_4HCO_3$, $(NH_4)_2HPO_4$ acetate, $NH_4$ oxalate, and the like; $(NH_3R)NO_3$ (wherein R is an alkyl or cycloalkyl group having from 1–10 carbon atoms per molecule), $(NH_3R)Cl$, $(NH_3R)HSO_4$, and the like; $(NH_2R_2)NO_3$, $(NH_2R_2)Cl$, $(NH_2R_2)HSO_4$, and the like; $(NHR_3)NO_3$, $(NHR_3)Cl$, $(NHR_3)HSO_4$, and the like; $(NR_4)NO_3$, $(NR_4)Cl$, $(NR_4)HSO_4$, and the like; and mixtures of the above ammonium compounds. It is understood that the ammonium compound must be sufficiently soluble in the solvent of the solution to be effective in step (a).

The solution employed in step (a) of the process can contain any suitable solvent which dissolves an amount of the ammonium compound sufficient to be effective in step (a). Non-limiting solvents are water (preferred), methanol, ethanol, propanol, ethyl acetate, acetone, mixtures of the above, and the like.

Any suitable concentration of the ammonium compound in the solution of step (a) can be employed. Generally the concentration of the ammonium compound is in the range of from about 0.01 to about 5 mol/l, preferably from about 0.1 to about 2 mol/l. Any suitable ratio of solution to spent zeolite-containing catalyst composition can be employed in step (a). Generally, the ratio of number of grams of spent catalyst composition to number of liters of solution is in the range of from about 1:1 to about 1000:1, preferably from about 10:1 to about 100:1. Generally, the ratio of the number of grams of spent catalyst to the number of moles of dissolved ammonium compound in step (a) is in the range of from about 1:1 to about 1000:1, preferably from about 10:1 to about 100:1.

The contacting of the spent zeolite-containing catalyst composition and the solution of the ammonium compound in step (a) can be carried out in any suitable manner. It can be done as a batch process in a vessel, preferably with agitation. Or it can be done continuously, such as by passing a solution of the ammonium compound through a column filled with a spent catalyst composition. Any suitable time of contact between solution and spent catalyst composition can be employed, generally from about 0.5 to about 10 hours (preferably about 1–4 hours). Any suitable temperature can be employed in step (a), generally from about 10° C. to about 100° C. (preferably about 80°–95° C.).

Any suitable means for at least partially (preferably substantially) separating the spent catalyst composition which has been treated in step (a) from the solution used in step (a) can be employed in step (b). Non-limiting examples of suitable solid/liquid separation means are filtration, centrifugation, settling and subsequent draining or decantation of the liquid, and the like.

Preferably, the at least partially separated catalyst composition obtained in step (b) is dried in step (b1), so as to substantially remove adhered solvent in particular water therefrom. Preferred drying conditions comprise a temperature of about 80°–120° C., at atmospheric pressure conditions, and a drying time of about 0.5–10 hours. Optionally, the at least partially (preferably substantially) separated catalyst composition is washed with a suitable liquid (e.g., water), preferably after the separation step (b) and before the above-described drying step (b1).

Contacting step (c) can be carried out with $NH_4F$ (preferred), $NH_4HF_2$, HF, or mixtures of two or three of these compounds. Preferably, the fluorine compound employed in step (c) is dissolved in a suitable solvent (more preferably water, less preferably an aliphatic alcohol having from 1–8 carbon atoms per molecule).

In a preferred embodiment, a solution of a fluorine compound (more preferably NH$_4$F) in water having a concentration of about 0.3–2 mol/l (more preferably about 0.8–1.2 mol/l) of the fluorine compound is employed in step (c). Preferably, the ratio of number of millimoles of the fluorine compound to the number of grams of the at least partially separated (and preferably dried) NH$_4$-exchanged catalyst composition having undergone steps (a) and (b) is in the range of from about 0.01:1 to about 10:1, more preferably from about 0.2:1 to about 1:1. When a solution of the fluorine compound is employed, the ratio of the number of cubic centimeters of solution to the number of grams of at least partially separated (and preferably dried) NH$_4$-exchanged catalyst composition is in the range from about 0.04:1 to about 5:1, preferably from about 0.2:1 to about 1:1. Any suitable temperature, contact time, and other contacting parameters can be employed in step (c). Preferred temperature/time conditions in step (c) are the same as those in step (a). Preferably, step (c) is carried out with agitation, either as a continuous process or as a batch process.

Any heating conditions can be employed in the optional (preferred) heating step (c1). Preferably, the catalyst composition which has undergone treatment steps (a), (b) and (c) is heated in step (c1) at a temperature in the range of from about 80° to about 700° C., preferably from about 450° to about 550° C. The heating time preferably is in the range of from about 0.1 to about 10 hours (more preferably 1–3 hours). Pressure conditions can be atmospheric (i.e., about 1 atm) or subatmospheric or superatmospheric. Preferably, the heating step (c1) is carried out in an oxidizing gas atmosphere, more preferably in a free oxygen containing gas such as air. However, an inert gas atmosphere can also be employed. It is within the scope of this invention to carry out heating step (c1) in two substeps: first substantially drying the catalyst composition obtained in step (c) (preferably at about 80°–120° C. for about 0.5–5 hours), and thereafter calcining it (preferably at about 450°–550° C. for about 0.5–5 hours; more preferably in air).

Metals passivating step (d) can be carried out in any suitable manner with the material obtained in step (c) or, alternatively, (c1). The term "metals passivating", as used herein, implies that the detrimental effect of generating H$_2$ during catalytic cracking caused by metal deposits on a cracking catalyst composition has been mitigated. Any suitable metals passivating agents selected from the group consisting of compounds of Be, Mg, Ca, Sr, Ba, B, Al, Sb, and P can be used for contacting the material obtained in step (c) or, alternatively, (c1). Non-limiting examples of such compounds are described in U.S. Pat. Nos. 3,711,422, 4,025,458, 4,321,128, 4,337,144, 4,473,463, and 4,728,629, the disclosures of which are incorporated herein by reference. Preferred passivating agents include: antimony tris(O,O-dihydrocarbyl) phosphorodithioates, antimony oxides, antimony carboxylates, antimony mercaptides, and the compounds of Mg, Ca, B, Al, P and Sb described in Examples I and II.

Metals passivating step (d) can be carried out in two sub-steps: (d1) and (d2). In contacting sub-step (d1), the material obtained in step (c) or, alternatively, (c1) is contacted (generally impregnated or sprayed) with a solution of at least one metals passivating agent in a suitable solvent so as to incorporate into the material obtained in step (c) or, alternatively, (c1) an effective amount of the metals passivating agent. Any effective concentration of each metals passivating agent in the solution can be applied (preferably about 0.01–0.5 mol/l). Any suitable weight ratio of metals passivating agent to the material obtained in step (c) or, alternatively, (c1) can be applied in the metals passivating sub-step (d1). Generally, this weight ratio is in the range of from about 0.00001:1 to about 0.5:1, preferably in the range of from about 0.001:1 to about 0.2:1. Generally, the contacting sub-step (d1), described above, is carried out at any suitable temperature, preferably, at a temperature of about 10° to about 95° C.

Preferably, this contacting sub-step (d1) is followed by a drying step (d2) (preferably in air or an inert gas such as N$_2$, for about 0.2–10 hours, at a temperature of about 100° to about 150° C.), and, optionally, thereafter by an additional calcining sub-step (d3) (preferably at a temperature of about 450° to about 750° C., for about 0.2–10 hours, in air or an inert gas such as N$_2$). In the calcining sub-step, generally the applied metals passivating agent is substantially converted to an oxidic form (e.g., Sb$_2$O$_3$ or CaO or the like).

Any suitable effective total level of the metals passivating agent in the material obtained in step (d) can be attained. Generally, this level is in the range of from about 0.01 to about 5 weight-% of metals passivating element (such as Sb, Ca, etc. and mixtures thereof), based on the weight of the material obtained in step (d). Preferably, this level is about 0.01 to about 2 weight-% of metals passivating element.

The reactivated catalyst composition obtained in step (d) can be used in any catalytic cracking process, i.e., a process for catalytically cracking hydrocarbon-containing oil feedstocks, in any suitable cracking reactor (e.g., in a FCC reactor or in a Thermofor moving bed reactor), essentially in the absence of added hydrogen gas. The reactivated catalyst composition obtained in step (d) can be used alone or in admixture with fresh (unused) zeolite-containing catalyst composition in catalytic cracking processes.

The hydrocarbon-containing feed stream for the catalytic cracking process of this invention can be any suitable feedstock. Generally the feed has an initial boiling point (ASTM D 1160) in excess of about 400° F., preferably a boiling range of from about 400° to about 1200° F., more preferably a range of from about 500° to about 1100° F., measured at atmospheric pressure conditions. The API gravity (measured at 60° F.) generally is in the range of from about 5 to about 40, preferably from about 10 to about 35. Frequently these feedstocks contain Ramsbottom carbon residue (ASTM D524; generally about 0.1–20 weight-%), sulfur (generally about 0.1–5 weight-% S), nitrogen (generally about 0.05–2 weight-% N), nickel (generally about 0.05–30 ppm Ni, i.e., parts by weight of Ni per million parts by weight of feed), vanadium (generally about 0.1–50 ppm V) and copper (generally about 0.01–30 ppm Cu). Non-limiting examples of suitable feedstocks are light gas oils, heavy gas oils, vacuum gas oils, cracker recycle oils (cycle oils), residua (such as distillation bottoms fractions), and hydrotreated residua (e.g., hydrotreated in the presence of Ni, Co, Mo-promoted alumina catalysts), liquid coal pyrolyzates, liquid products from extraction or pyrolysis of tar sand, shale oils, heavy fractions of shale oils, and the like. The presently most preferred feedstocks are heavy gas oils and hydrotreated residua.

Any suitable reactor can be used for the catalytic cracking process of this invention. Generally, a fluidized-bed catalytic cracking (FCC) reactor (preferably containing one or more risers) or a moving-bed catalytic cracking reactor (e.g., a Thermofor catalytic cracker) is employed, preferably a FCC riser cracking unit. Examples of such FCC cracking units are described in U.S. Pat. Nos. 4,377,470 and 4,424,116. Generally, a catalyst regeneration unit (for removal of coke deposits) is combined with the FCC cracking unit, as is shown in the above-cited patents.

Specific operating conditions of the cracking operation depend greatly on the type of feed, the type and dimensions of the cracking reactor and the oil feed rate. Examples of operating conditions are described in the above-cited patents and in many other publications. In an FCC operation, generally the weight ratio of catalyst composition to oil feed (i.e., hydrocarbon-containing feed) ranges from about 2:1 to about 10:1, the contact time between oil feed and catalyst is in the range of from about 0.2 to about 2.0 seconds, and the cracking temperature is in the range of from about 800° to about 1200° F. Generally, steam is added with the oil feed to the FCC reactor so as to aid in the dispersion of the oil as droplets. Generally, the weight ratio of steam to oil feed is in the range of from about 0.05:1 to about 0.5:1.

The separation of spent (i.e., used) cracking catalyst from gaseous and liquid cracked products and the separation of cracking products into various gaseous and liquid product fractions can be carried out by any conventional separation means. The most desirable product fraction is gasoline (ASTM boiling range: about 180°–400° F.). Non-limiting examples of such separation schemes are shown in "Petroleum Refining" by James H. Gary and Glenn E. Handwerk, Marcel Dekker, Inc., 1975.

Generally, cracking catalysts are regenerated, preferably by steam stripping for removal of adhered oil and subsequent heating under oxidizing conditions so as to burn off carbon deposits. At least a portion of the regenerated cracking catalyst composition can then be treated by the reactivation process of this invention comprising steps (a)–(d), and thereafter be recycled to the catalytic cracking reactor, generally in admixture with fresh (unused) cracking catalyst.

The following examples are present to further illustrate this invention and are not to be considered as unduly limiting the scope of this invention.

EXAMPLE I

This example illustrates methods for reactivating a zeolite-containing equilibrium catalyst, i.e., a catalytic cracking catalyst a portion of which had previously been employed in a catalytic cracking process and had then been regenerated.

Catalyst A (Control) was a GXO-40 equilibrium catalyst, which had been supplied as fresh catalyst by Davison Chemical Division of W. R. Grace and Company, Baltimore, MD, and had previously been employed in a commercial FCC cracking process in a refinery of Phillips Petroleum Company and thereafter regenerated by heating in air. The fresh catalyst contained about 25 weight-% zeolite and about 75 weight-% silica-alumina matrix. Catalyst A contained about 0.24 weight-% Ni, about 0.34 weight-% V, about 0.61 weight-% Fe, about 0.01 weight-% Cu, 0.05–0.15 weight-% Sb and about 0.36 weight-% Na. Catalyst A had a surface area of 113 $m^2/g$, a total pore volume of 0.23 cc/g, an apparent bulk density of 0.89 g/cc, and a zeolite unit cell size of 24.39 Å.

Catalyst B (Control) was prepared substantially in accordance with the reactivation procedure of U.S. Pat. No. 4,814,066. 10 lb. of Catalyst A was mixed with a solution of 6.4 lb. $NH_4NO_3$ in 240 gallons of $H_2O$. The mixture was stirred while the temperature was raised to 90° C., and then kept at that temperature for 2 hours. The $NH_4NO_3$-treated catalyst was separated from the solution by filtration, washed three times with deionized water, dried at 120° C. for about 16 hours in a vacuum oven, and finally calcined on a belt calciner at 500° C. in air for 2 hours. This procedure was carried out with five 10 lb. batches, so as to produce about 48 lb. of $NH_4$-exchanged catalyst material.

48 lb. of the calcined, $NH_4^+$-exchanged material was then sprayed with a solution of 0.69 lb $NH_4F$ in 24 lb distilled water in a rotating barrel mixer (cement mixer). The thus $NH_4F$-treated material was dried in a vacuum oven at 120° C. for 16 hours, and then calcined at 500° C. in air for 2 hours.

Catalyst C (Control) was antimony-treated equilibrium Catalyst A. 33 grams of Catalyst A were soaked and stirred with a solution of 0.36 grams of Vanlube 672 (provided by R. T. Vanderbilt Company, Norwalk, CT; containing Sb tris(0,0-dipropyl) phosphordithioate at a concentration of 10.5 weight-% Sb) which has been diluted with about 50 cc of toluene. The thus Sb-impregnated material was heated to dryness in a drying dish, heated in a stream of nitrogen at a temperature ranging from 400° F. (initial) to 1200° F. (final) for 1 hour, and then heated in air at 1250° F. for 1 hour.

Catalyst D (Invention) was prepared by impregnation of Catalyst B ($NH_4NO_3/NH_4F$-treated spent catalyst) with Vanlube 672, followed by drying and calcining, essentially in accordance with the procedure for Catalyst C. Catalyst D contained 0.24 weight-% Ni, 0.29 weight-% V and 0.27 weight-% Sb (0.115 weight-% Sb of which had been added by impregnation with Vanlube 672, while about 0.15 weight-% Sb was already present in Catalyst B).

Catalysts A through D were then evaluated in a MCBU (micro-confined bed unit) cracking test reactor, substantially in accordance with the procedure of Example II of U.S. Pat. No. 4,794,095. Cracking test conditions comprised a temperature of about 950° F., a catalyst to oil weight ratio of 6:1, and the use of a hydrotreated residuum as oil feed having API gravity at 60° C. of 18.7, sulfur content of 0.53 weight-%, basic nitrogen content of 0.09 weight-%, Conradson carbon content of 6.7 weight-%, nickel content of 10.6 ppm (parts per million by weight) and vanadium content of 12.7 ppm. Test results are summarized in Table I.

TABLE 1

| Run | Catalyst | Catalyst Treatment | Conversion (Wt-% of Feed) | Gasoline Yield (Wt-% of Converted Feed) | $H_2$ Generation (SCF/BL Converted Feed) |
|---|---|---|---|---|---|
| 1 | A | None | 73 | 50 | 378 |
| 2 | " | " | 73 | 49 | 359 |
| 3 | " | " | 74 | 51 | 370 |
| 4 | " | " | 72 | 50 | 363 |
|   |   | Average | 73 | 50 | 368 |

TABLE 1-continued

| Run | Catalyst | Catalyst Treatment | Conversion (Wt-% of Feed) | Gasoline Yield (Wt-% of Converted Feed) | H₂ Generation (SCF/BL Converted Feed) |
|---|---|---|---|---|---|
| 5 | C | A + Sb | 74 | 50 | 334 |
| 6 | " | " | 74 | 50 | 322 |
| 7 | " | " | 72 | 49 | 325 |
| 8 | " | " | 72 | 48 | 311 |
|   |   | Average | 73 | 49 | 323 |
| 9 | B | U.S. Pat. No. 4,814,066 | 83 | 52 | 211 |
| 10 | " | " | 81 | 52 | 255 |
| 11 | " | " | 82 | 53 | 254 |
| 12 | " | " | 78 | 51 | 269 |
|   |   | Average | 81 | 52 | 247 |
| 13 | D | B + Sb | 82 | 53 | 129 |
| 14 | " | " | 81 | 52 | 154 |
| 15 | " | " | 80 | 51 | 173 |
| 16 | " | " | 79 | 52 | 184 |
|   |   | Average | 81 | 52 | 160 |

Note:
Light Cycle Oil Yield was about 17 in runs 1-8 and about 13 in runs 9-16.

Test results in Table I show that antimony treatment of $NH_4NO_3/NH_4F$-reactivated spent cracking catalyst B (prepared in accordance with U.S. Pat. No. 4,814,066) resulted in a 35% reduction in hydrogen generation (compare test results for B vs. D), whereas antimony treatment of an untreated spent cracking catalyst resulted in a 12% reduction in $H_2$ generation (compare test results for A vs. C). Thus, the treatment with Catalyst I (Invention) was prepared by impregnation with 35 grams of Catalyst B with 0.078 grams of Ca(NO₃)₂·4H₂O dissolved in 17 cc of water, followed by drying and calcining, as described for Catalyst C.

Catalysts E through I were tested in a MCBU cracking test unit at conditions described in Example I. Averages of 3-4 test runs for each catalyst are summarized in Table II.

TABLE II

| Cat. | Added Metals Passiv. Agent | Conversion (Wt-% of Feed) | Gasoline Yield (Wt-% of Conv. Feed) | H₂ Yield (SCF/BL Conv. Feed) |
|---|---|---|---|---|
| B | None | 81 | 52 | 247 |
| D | B + 1150 ppm Sb | 81 | 52 | 186 |
| E | B + 255 ppm Al | 81 | 52 | 189 |
| F | B + 292 ppm P | 80[1] | 52[1] | 190[1] |
| G | B + 102 ppm B | 80 | 52 | 204 |
| H | B + 230 ppm Mg | 80 | 52 | 202 |
| I | B + 379 ppm Ca | 80 | 51 | 181 |

[1]Estimated from related test data.

Sb of the reactivated catalyst of U.S. Pat. No. 4,818,066 was considerably more effective in reducing hydrogen generation than what would have been expected.

EXAMPLE II

This example illustrates the effects of various metals passivating agents (in terms of reduced hydrogen generation during catalytic cracking) on the reactivated catalyst of U.S. Pat. No. 4,814,066.

Catalyst E (Invention) was prepared by impregnation of 35 grams of Catalyst B ($NH_4NO_3/NH_4F$-treated spent catalyst) with 0.124 grams of Al(NO₃)₃·9H₂O dissolved in 17 cc of water, followed by drying and calcining, as described for Catalyst C.

Catalyst F (Invention) was prepared by impregnation of 35 grams of Catalyst B with 0.090 grams of p-tolyldiphenyl phosphine (provided by Strem Chemicals, Inc., Newburyport, MA) dissolved in 17 cc of toluene, followed by drying and calcining, as described for Catalyst C.

Catalyst G (Invention) was prepared by impregnation of 35 grams of Catalyst B with 0.096 grams of triphenyl borate, (C₆H₅O)₃B dissolved in 17 cc of acetone, followed by drying and calcining, as described for Catalyst C.

Catalyst H (Invention) was prepared by impregnation of 35 grams of Catalyst B with 0.071 grams of magnesium acetate dissolved in 17 cc of water, followed by drying and calcining, as described for Catalyst C.

Test results in Table II indicate that smaller amounts of Al, P, B, Mg and Ca than of Sb were needed to attain a specific reduction in hydrogen generation caused by metal deposits (Ni, V, Cu) on $NH_4NO_2/NH_4F$-treated spent cracking catalysts.

EXAMPLE III

This example illustrates how a heating step after the sequential treatment of a spent cracking catalyst with $NH_4NO_3$ and $NH_4F$ and before the impregnation with an antimony metals passivating agent affected catalyst performance.

Catalyst J was an FCC plant equilibrium catalyst. Catalyst J contained about 0.23 weight-% Ni, about 0.14 weight-% V, about 0.43 weight-% Fe, about 0.04 weight-% Sb, and about 0.25 weight-% Na. Catalyst J had a surface area of 125 m²/g, a total pore volume of 0.19 cc/g, and a zeolite unit cell size of 24.35 Å. Catalyst J had not undergone any chemical treatment prior to testing.

Catalyst K was prepared from Catalyst J substantially in accordance with the preparation of Catalyst D (see Example I), except that only about 0.1 weight-% Sb had been incorporated into the catalyst with Phil-Ad CA 6000 (an aqueous dispersion of Sb₂O₅, containing about 20 weight-% Sb; provided by Catalyst Resources, Inc., Pasadena, Tex.). The $NH_4NO_3/NH_4F$-treated catalyst had been heated at about 250° F. for at least 2 hours before impregnation with the aqueous Sb₂O₅ dispersion.

Catalyst L was prepared in accordance with Catalyst K except that no heating step was carried out after the NH$_4$NO$_3$/NH$_4$-treatment before impregnation with the antimony solution. Thus, the antimony solution was applied to the wet NH$_3$NO$_3$/NH$_4$F-treated spent catalyst.

Catalysts J, K, and L were evaluated in an MCBU cracking reactor in accordance with the procedure described in Example I. The results are summarized in Table III.

TABLE III

| Catalyst | % Feed Conversion | Gasoline Yield % | Generated H2 (SCF/BL.) |
|---|---|---|---|
| J | 76 | 50 | 410 |
| L | 78 | 51 | 252 |
| K | 79 | 52 | 177 |

Test data in Table III clearly show that a heating step after treatment with NH$_4$NO$_3$ and NH$_4$F and before Sb treatment is not necessary but is beneficial, in particular in terms of lower hydrogen generation.

Reasonable variations, modifications and adaptations for various conditions and uses can be made within the scope of the disclosure and appended claims.

That which is claimed is:

1. A process for reactivating a spent zeolite-containing cracking catalyst composition comprising the steps of:
   (a) contacting a spent zeolite-containing catalytic cracking catalyst composition, which contains at least one metal contaminant, with a solution of an ammonium compound other than ammonium fluoride, under such conditions as to enhance the catalytic cracking activity of said catalyst composition;
   (b) at least partially separating the catalyst composition having enhanced catalytic cracking activity obtained in step (a) from said solution used in step (a);
   (c) contacting the at least partially separated cracking catalyst composition having undergone steps (a) and (b) with at least one fluorine compound selected from the group consisting of NH$_4$F, NH$_4$HF$_2$ and HF, under such conditions as to enhance the catalytic cracking activity of the catalyst composition having undergone steps (a) and (b); and
   (d) treating the reactivated catalyst composition obtained in step (c) with at least one metals passivating agent selected from the group consisting of compounds of beryllium, magnesium, calcium, strontium, barium, boron, aluminum, antimony, and phosphorus, under such conditions as to reduce hydrogen generation caused by said at least one metal contaminant during catalytic cracking.

2. A process in accordance with claim 1, wherein said at least one metal contaminant contained in said spent cracking catalyst composition is selected from the group consisting of compounds of nickel, vanadium, iron and copper.

3. A process in accordance with claim 2, wherein the level of said at least one metal contaminant in said spent cracking catalyst composition used in step (a) is in the range of from about 0.01 to about 2.0 weight-% of contaminant of each metal, expressed as metal oxide.

4. A process in accordance with claim 1, wherein said solution used in step (a) is an aqueous solution comprising NH$_4$NO$_3$.

5. A process in accordance with claim 4, wherein the concentration of NH$_4$NO$_3$ in said solution used in steps (a) is in the range of from about 0.01 to about 5 mol/l NH$_4$NO$_3$, and the ratio of the number of grams of spent catalyst composition to the number of moles of dissolved NH$_4$NO$_3$ in steps (a) is in the range of from about 1:1 to about 1000:1.

6. A process in accordance with claim 1, wherein said fluorine compound used in step (c) is NH$_4$F.

7. A process in accordance with claim 6, wherein NH$_4$F is employed as a solution in water.

8. A process in accordance with claim 7, wherein the solution of NH$_4$F in water has a concentration in the range of from about 0.3 to about 2.0 mol/l NH$_4$F, and the ratio of the number of millimoles of NH$_4$F to the number of grams of said at least partially separated cracking catalyst composition in step (c) is in the range of from about 0.01:1 to about 10:1.

9. A process in accordance with claim 1 comprising the additional step of drying the cracking catalyst composition obtained in step (b), before carrying out step (c).

10. A process in accordance with claim 1, wherein step (a) is carried out with an aqueous solution of NH$_4$NO$_3$, step (c) is carried out with an aqueous solution of NH$_4$F, the concentration of NH$_4$NO$_3$ in the solution used in step (a) is about 0.1–2 mol/l, and the concentration of NH$_4$F in the solution used in step (c) is about 0.8–1.2 mol/l.

11. A process in accordance with claim 1, comprising the additional step (c1) of heating the catalyst composition obtained in step (c) at a temperature in the range of from about 80° to about 700° C. for a period of time in the range of from about 0.1 to about 10 hours.

12. A process in accordance with claim 11, wherein heating step (c1) is carried in two sub-steps: first substantially drying the catalyst composition obtained in step (c), and thereafter calcining the substantially dried catalyst composition at a temperature in the range of from about 450° to about 550° C.

13. A process in accordance with claim 1, wherein said at least one metals passivating agent used in step (d) is selected from the group consisting of compounds of Mg, Ca, B, Al, P and Sb.

14. A process in accordance with claim 1, wherein step (d) is carried out in three sub-steps:
   (d1) contacting the catalyst composition obtained in step (c) with a solution of said at least one metals passivating agent under such conditions as to incorporate into said catalyst composition obtained in step (c) an effective amount of said at least one metals passivating agent,
   (d2) drying the catalyst composition obtained in step (d1), and
   (d3) calcining the catalyst composition obtained in step (d2) under such conditions as to substantially convert said at least one metals passivating agent to an oxidic from.

15. A process in accordance with claim 14, wherein the catalyst composition obtained in step (c) is heated in a heating step (c1) at a temperature in 'he range of about 80° C. to about 700° C. for a period of time of from about 0.1 to about 10 hours, and step (d1) is carried with the catalyst composition obtained in step (c1).

16. A process in accordance with claim 1, wherein the level of said at least one metals passivating agent in the catalyst composition obtained in step (d) is about 0.01–5 weight-% of metals passivating element.

17. A process in accordance with claim 16, wherein said metals passivating element is selected from the group consisting of Mg, Ca, B, Al, P, Sb and mixtures thereof.

18. A cracking process comprising the step of contacting a hydrocarbon-containing feed stream with a zeolite-containing cracking catalyst composition, under such cracking conditions as to obtain at least one normally liquid hydrocarbon-containing product stream having a lower initial boiling point and higher API gravity than said hydrocarbon-containing feed stream; wherein at least a portion of said cracking catalyst composition is a reactivated spent catalyst composition having undergone a reactivation process comprising the steps of:
(a) contacting a spent zeolite-containing cracking catalyst composition which contains at least one metal contaminant with a solution of an ammonium compound other than ammonium fluoride, under such contacting conditions as to enhance the cracking activity of said cracking catalyst composition;
(b) at least partially separating the cracking catalyst composition having enhanced cracking activity obtained in step (a) from said solution used in step (a);
(c) contacting the at least partially separated cracking catalyst composition having undergone steps (a) and (b) with at least one fluorine compound selected from the group consisting of $NH_4F$, $NH_4HF_2$ and HF, under such conditions as to enhance the catalyst cracking activity of the catalyst composition having undergone steps (a) and (b); and
(d) treating the reactivated catalyst composition obtained in step (c) with at least one metals passivating agent selected from the group consisting of compounds of beryllium, magnesium, calcium, strontium, barium, boron, aluminum, antimony, and phosphorus, under such conditions as to reduce hydrogen generation caused by said at least one metal contaminant during catalytic cracking.

19. A process in accordance with claim 18, wherein said at least one metal contaminant contained in said spent cracking catalyst composition is selected from the group consisting of compounds of nickel, vanadium, iron and copper.

20. A process in accordance with claim 19, wherein the level of said at least one metal contaminant in said spent cracking catalyst composition used in step (a) is in the range of from about 0.01 to about 2.0 weight-% of contaminant of each metal, expressed as metal oxide.

21. A process in accordance with claim 18, wherein said solution used in step (a) is an aqueous solution comprising $NH_4NO_3$.

22. A process in accordance with claim 21, wherein the concentration of $NH_4NO_3$ in said solution used in step (a) is in the range of from about 0.01 to about 5 mol/l $NH_4NO_3$, and the ratio of the number of grams of spent catalyst composition to the number of moles of dissolved $NH_4NO_3$ in step (a) is in the range of from about 1:1 to about 1000:1.

23. A process in accordance with claim 18, wherein said fluorine compound used in step (c) is $NH_4F$.

24. A process in accordance with claim 23, wherein $NH_4F$ is employed as a solution in water.

25. A process in accordance with claim 24, wherein the solution of $NH_4F$ in water has a concentration in the range of from about 0.3 to about 2.0 mol/l $NH_4F$, and the ratio of the number of millimoles of $NH_4F$ to the number of grams of said at least partially separated cracking catalyst composition in step (c) is in the range of from about 0.01:1 to about 10:1.

26. A process in accordance with claim 18 comprising the additional step of drying the cracking catalyst composition obtained in step (b) before carrying out step (c).

27. A process in accordance with claim 18, wherein step (a) is carried out with an aqueous solution of $NH_4NO_3$, step (c) is carried out with an aqueous solution of $NH_4F$, the concentration of $NH_4NO_3$ in the solution used in step (a) is about 0.1–2 mol/l, and the concentration of $NH_4F$ in the solution used in step (c) is about 0.8–1.2 mol/l.

28. A process in accordance with claim 18, comprising the additional step (c1) of heating the catalyst composition obtained in step (c) at a temperature in the range of from about 80° to about 700° C. for a period of time in the range of from about 0.1 to about 10 hours.

29. A process in accordance with claim 28, wherein heating step (c1) is carried in two sub-steps: first substantially drying the catalyst composition obtained in step (c), and thereafter calcining the substantially dried catalyst composition at a temperature in the range of from about 450° to about 550° C.

30. A process in accordance with claim 18, wherein said at least one metals passivating agent used in step (d) is selected from the group consisting of compounds of Mg, Ca, B, Al, P, and Sb.

31. A process in accordance with claim 18, wherein step (d) is carried out in these sub-steps:
(d1) contacting the catalyst composition obtained in step (c) with a solution of said at least one metals passivating agent, under such conditions as to incorporate into said catalyst composition obtained in step (c) an effective amount of said at least one metals passivating agent,
(d2) drying the catalyst composition obtained in step (d1), and
(d3) calcining the catalyst composition obtained in step (d2), under such conditions as to substantially convert said at least one metals passivating agent to an oxidic form.

32. A process in accordance with claim 31, wherein the catalyst composition obtained in step (c) is heated in a heating step (c1) at a temperature in the range of about 80° C. to about 700° C. for a period of time of from about 0.1 to about 10 hours, and wherein step (d1) is carried with the catalyst composition obtained in step (c1).

33. A process in accordance with claim 18, wherein the level of said at least one metals passivating agent in the catalyst composition obtained in step (d) is about 0.01–5 weight-% of metals passivating element.

34. A process in accordance with claim 33, wherein said metals passivating element is selected from the group consisting of Mg, Ca, B, Al, P, Sb and mixtures thereof.

35. A cracking process in accordance with claim 18, wherein said hydrocarbon-containing feed stream has an initial boiling point, determined in accordance with ASTM method D 1160, of at least 400° F., measured at atmospheric pressure conditions, and an API gravity in the range of from about 5 to about 40.

36. A cracking process in accordance with claim 35, wherein said hydrocarbon-containing feed stream has a boiling range of from about 500° F. to about 1110° F.

and an API gravity in the range of from about 10 to about 35.

37. A cracking process in accordance with claim 18, wherein said hydrocarbon-containing feed stream contains about 0.1–20 weight-% Ramsbottom carbon residue, about 0.1–5 weight-% sulfur, about 0.05–2.0 weight-% nitrogen, about 0.05–30 ppm nickel, about 0.1–50 ppm vanadium and about 0.01–30 ppm copper.

38. A cracking process in accordance with claim 18, wherein said hydrocarbon-containing feed stream is selected from the group consisting of heavy gas oils and hydrotreated residue.

39. A cracking process in accordance with claim 18, wherein said cracking conditions comprise a temperature in the range of from about 800° to about 1200° F., and a weight ratio of said catalyst composition to said hydrocarbon-containing feed in the range of from about 2:1 to about 10:1.

40. A cracking process in accordance with claim 18, wherein steam is present at a weight ratio of steam to said hydrocarbon-containing feed stream in the range of from about 0.05:1 to about 0.5:1.

41. A cracking process in accordance with claim 18 comprising the additional steps of
separating used cracking catalyst composition from gaseous and liquid cracked products,
steam-stripping the thus separated used cracking catalyst composition, and
heating the steam-stripped cracking catalyst composition under oxidizing conditions so as to burn off coke deposited thereon.

* * * * *